Figure 1:
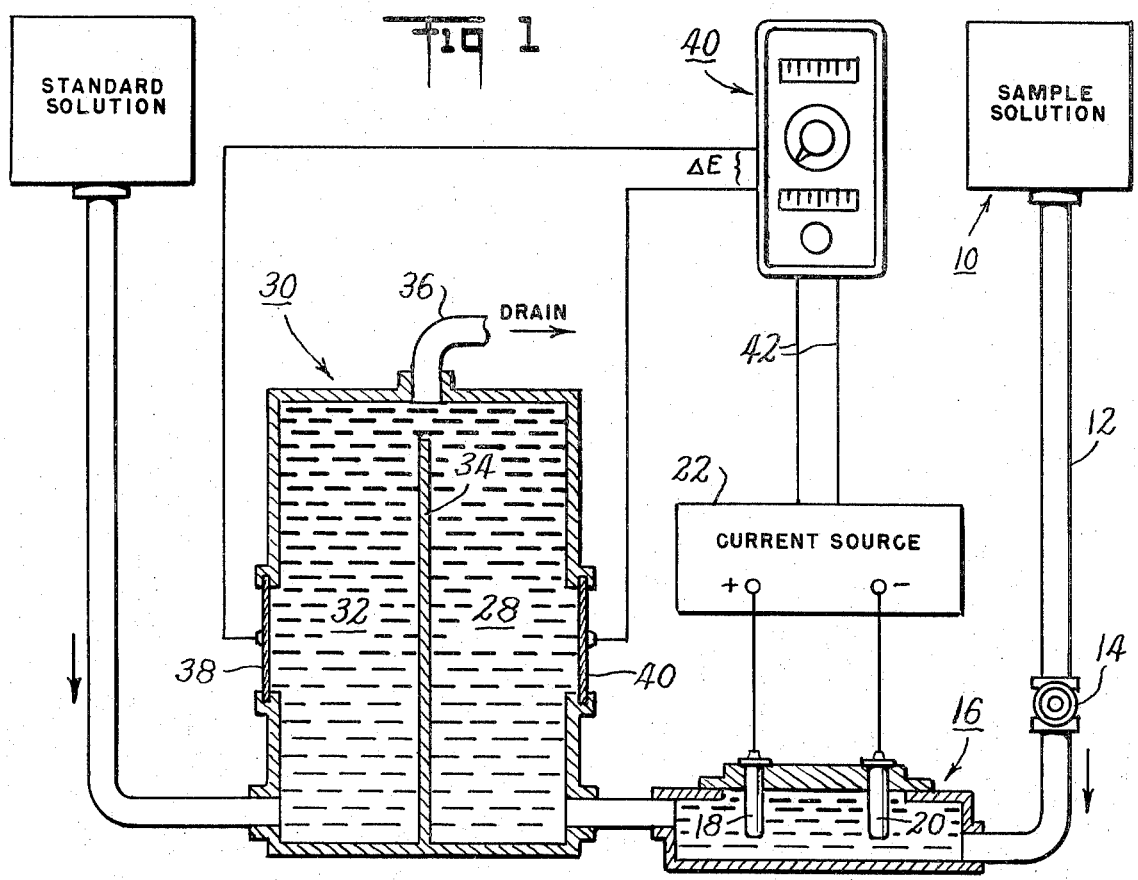

United States Patent [19]
Fletcher, III

[11] 3,856,633
[45] Dec. 24, 1974

[54] CONCENTRATION MEASUREMENTS UTILIZING COULOMETRIC GENERATION OF REAGENTS

[75] Inventor: Kenneth S. Fletcher, III, Norfolk, Mass.

[73] Assignee: The Foxboro Company, Foxboro, Mass.

[22] Filed: Jan. 7, 1971

[21] Appl. No.: 104,661

[52] U.S. Cl............................ 204/1 T, 204/195 M
[51] Int. Cl.......................................... G01n 27/46
[58] Field of Search............ 204/1 T, 195 R, 195 M, 204/195 T, 242, 252, 257, 263–266, 275–278

[56] References Cited
UNITED STATES PATENTS

| | | | |
|---|---|---|---|
| 2,928,775 | 3/1960 | Leisey............................ | 204/195 T |
| 3,032,493 | 5/1962 | Coulson et al.................. | 204/195 T |
| 3,338,812 | 8/1967 | Dworak et al................... | 204/195 T |
| 3,655,526 | 4/1972 | Christian........................ | 204/195 T |

OTHER PUBLICATIONS

Fletcher, et al., "Anal. Chem.," Vol. 42, No. 2, Feb., 1970, pp. 285–287.
Durst et al., "Anal. Chem.," Vol. 40, No. 8, July, 1968, pp. 1343 & 1344.
"Ion-Selective Electrodes," NBS Special Pub. 314, 1969, pg. 177.
"Ion-Selective Electrodes", NBS Special Pub. 314, 1969, pp. 367–369.

*Primary Examiner*—T. Tung
*Attorney, Agent, or Firm*—Bryan, Parmelle, Johnson & Bollinger

[57] ABSTRACT

Apparatus and method for measuring ionic concentration by electro-chemical means, wherein a two-compartment measuring cell is provided with ion-sensitive membranes to produce a voltage responsive to the difference in concentration of a predetermined reagent to the difference in concentration of a predetermined reagent in the two compartments, one of the compartments being furnished with pure reagent from a standard solution, the other compartment being furnished with a mixture of the reagent and a sample ion the concentration of which is to be determined; the reagent in the latter mixture is generated coulometrically by an anode the current to which is controlled by the differential cell output signal; in one embodiment, a silver anode is isolated from the sample by a silver-sulfide membrane.

1 Claim, 2 Drawing Figures

PATENTED DEC 24 1974

3,856,633

INVENTOR.
Kenneth S. Fletcher, III
BY
Bryan, Parmelee, Johnson + Bollinger
ATTORNEYS

CONCENTRATION MEASUREMENTS UTILIZING COULOMETRIC GENERATION OF REAGENTS

This invention relates to coulometric generation of reagents for use in measuring ionic concentration or activity. More particularly, this invention relates to the generation of such reagents for measuring concentration by differential cell potentiometry or by titration techniques.

It is known that the ionic concentration or activity of a sample fluid can be measured by means of a differential cell having a membrane system sensitive to a reagent ion which reacts chemically with the ion of the sample material to be measured. As shown in copending application Ser. No. 887,092, filed by Truman S. Light, et al., on Dec. 22, 1969, now abandoned, such differential cell can have two compartments, one containing pure reagent and the second containing that same reagent mixed with sample fluid in a predetermined ratio. Because of the chemical interaction between the sample and the reagent, the concentration of the reagent ions in the second compartment will be less than the concentration of reagent ions in the first compartment, by an amount proportional to the fluid sample ionic concentration, and thus the electrical potential produced by the sensing membrane system will reflect the ionic concentration of the fluid sample. This differential cell concept makes it possible to measure the concentration of certain classes of ions for which there is not available a suitable membrane for making direct measurements, yet allows continuous measurements to be made of flowing liquids such as in an industrial process.

In accordance with one aspect of the present invention, the reagent to be mixed with the sample fluid is generated by coulometric techniques, providing very high precision. Such reagent/sample mixture may be directed as a continuous stream to one compartment of the differential cell while the other compartment is provided with a standard solution having a known concentration of the reagent. The amount of reagent generated coulometrically is automatically controlled so as to maintain an ion-balance condition in the differential cell, and at that balance point the magnitude of the coulometric current provides a measure of the ionic concentration of the fluid sample.

In accordance with another aspect of the invention, reagent is generated coulometrically in a separate generator compartment which is isolated from the flowing sample stream by a membrane selectively sensitive to the reagent ion. The reagent ion migrates into the sample stream to react chemically therewith, but other ions or materials cannot migrate in the reverse direction into the electrode chamber. Thus the electrode is protected from contamination, as by oxidizing mediums with which the sample fluid may be flowing. The ion transfer provides essentially 100% current efficiency in the disclosed arrangement, permitting the isolated ion source to be used for highly accurate titrations, as well as differential cell potentiometry.

Figure 2:
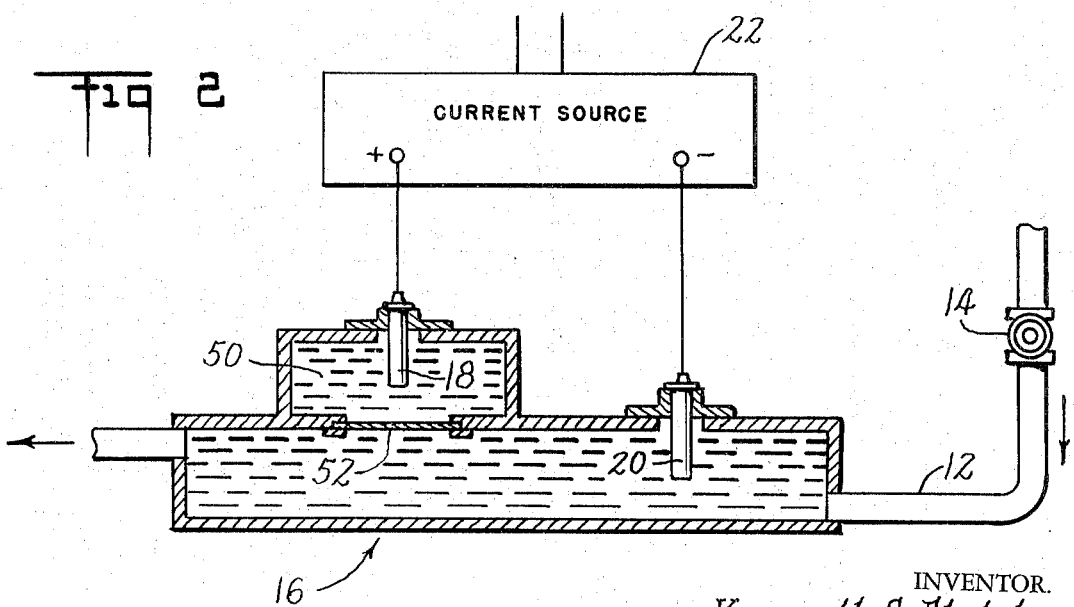

Accordingly, it is an object of this invention to provide improved means and techniques for use in ion concentration measurement systems wherein a reagent is generated by coulometry. One specific object of the invention is to provide an automatically operable system which is economical to construct yet effective in making industrial measurements. Another specific object is to provide novel means and methods to generate the reagent ion without significant contamination of the coulometric electrode. Other objects, aspects and advantages of the invention will in part be pointed out in, and in part apparent from, the following detailed description of presently preferred embodiments of the invention, considered together with the accompanying drawings, in which:

FIG. 1 shows, somewhat schematically, a differential cell ion concentration measuring system in which reagent is generated coulometrically; and FIG. 2 shows a modified arrangement wherein a coulometric silver electrode is isolated from the sample fluid by a silver-sulfide membrane.

Referring now to the right-hand edge of FIG. 1, there is shown a supply source 10 of sample fluid (illustratively a cyanide solution) the concentration of which is to be measured. (Although the supply source is shown simply as a tank, it will be understood that the supply can be in any convenient form, including means to continuously tap a portion of an industrial process while it is in operation.) The sample fluid from this source flows through a pipe 12 at a rate held constant by a flow regulator 14 of any appropriate type known in the art. The pipe directs the sample fluid into a reaction compartment or chamber 16 where the sample ions are reacted chemically with reagent ions.

In the chamber 16, reagent in the form of silver ions is generated by a coulometric generator comprising a silver anode 18 and a platinum cathode 20, both immersed in the flowing cyanide solution. These electrodes are connected to respective terminals of a controllable current source 22 which produces a flow of direct current through the electrodes and the sample liquid, so as to generate silver ions in the liquid. The rate of generation of silver ions, as is well known, is directly proportional to the magnitude of electric current. More specifically, the normality of the silver ion, N, produced by the coulometric generator, is given by:

$N = i/nFV_R$

Where:
$N$ = normality, in mols/liter.
$i$ = current in milliamps.
$n$ = a constant, equiv/mol.
$F$ = a constant, coul/equiv.
$V_R$ = volume rate of flow in ml/sec.

Because of the chemical reaction between the silver and cyanide ions in the flowing sample stream, the concentration of free silver ions in the reaction chamber will be reduced below the initial amount, i.e. the amount produced coulometrically. The system is so arranged that the rate of generation of silver ions is greater than the rate at which cyanide ions reach the chamber 16. Thus, all of the cyanide ions will be tied up, leaving an excess of free silver ions. It follows that the degree to which the silver ion concentration is reduced will be proportional to the concentration of the cyanide ions in the sample fluid entering the chamber.

This cyanide/silver mixture developed in the reaction chamber 16 flows (to the left) into one compartment 28 of a differential cell 30 such as described in the above-identified copending application Ser. No. 887,092. This cell includes a second compartment 32 into which flows a standard solution providing a supply of known reagent ions, in this case strong silver nitrate ($AgNO_3$) providing free silver ions. The two compartments 28, 32 are separated by a solid non-permeable partition 34 interrupted near its upper end to provide contact between the two fluids adjacent the common drain port 36. This junction region preferably is so arranged as to provide laminar mixing adjacent the drain; various geometrical configurations can be used to achieve this result.

The outer walls of the two compartments 28, 32 are provided with identical membranes 38, 40, specifically, in the disclosed embodiment, of silver-sulfide ($Ag_2S$). Such silver-sulfide membrane is selectively sensitive to silver ions, i.e. the silver-sulfide membrane will develop a primary response to silver ions, but no other.

The silver ions in contact with the membrane 38 or 40 produce at the membrane an electrical potential which is proportional to the concentration of silver ions. Thus, if the silver ion concentrations in the two compartments are unequal, there will be a potential difference between the two membranes. Such potential difference is sensed by a conventional electronic signal-sensing means 40, which may for example include the usual amplifier responsive to a voltage applied to its input terminals.

Sensing means 40 preferably also includes a conventional process controller arranged to produce an output control signal on a pair of wires 42 leading to the controllable current source 22. This process controller may for example be of the type disclosed in U.S. Pat. No. 3,467,874. The control signal from the controller continuously sets the magnitude of ion-producing current flow at whatever level is required to maintain the differential cell output voltage substantially at zero. That is, the coulometric generation of silver ions is constantly regulated, and readjusted whenever necessary, to maintain equal concentrations of silver ions in the two compartments 28, 32.

For example, if there is an increase in concentration of cyanide ions in the sample solution, there will momentarily be a decrease in the concentration of silver ions in the right-hand compartment 28 of the cell 30. This will cause a corresponding voltage differential at the input to sensing means 40. The control signal on wires 42 therefore will be altered accordingly so as to increase the rate of generation of silver ions until the ion balance in the cell 30 is restored.

With the differential cell output maintained at null, it will be evident that more silver ions are continuously being generated coulometrically than are necessary to react all of the cyanide in the sample solution. Put another way, all of the cyanide will be tied up by an equal amount of silver ions, and there will be an excess of silver ions carried to the right-hand compartment 28 of the cell at a rate just sufficient to maintain a balance with the silver ions flowing into the left-hand compartment. Thus, the total molar concentration of silver ions generated coulometrically (see equation above), minus the molar concentration of cyanide in the original sample solution stream, will equal the molar concentration of the standard solution. Therefore, the molar concentration of the sample solution (cyanide) can be expressed as:

$$N_{cyanide} = i/nFV_R - N_{standard}$$

Accordingly, the magnitude of current required to balance the differential cell provides a direct measure of the concentration of cyanide in the sample solution.

This same technique can be used with other chemicals. For example, generation of silver ions coulometrically can be used in systems for measuring concentration of sulfide, bromide, iodide, chloride, thiosulfate, and mercaptans.

In some cases, the sample solution may include material which tends to contaminate the silver anode. For example, the solution may include an oxidizing-medium, such as nitric acid, causing production of silver ions independently of the flow of current. Or the chemical reactant (e.g. silver cyanide) may tend to coat the electrode and ultimately interfere with the coulometric generation of reagent ions. To avoid such problems, the apparatus of FIG. 1 can be modified as illustrated schematically in FIG. 2, so as to isolate the silver anode from the influence of the sample solution.

Referring now to FIG. 2, the apparatus includes a separate generator compartment or chamber 50 containing the silver anode 18 immersed in a strong silver nitrate solution. Interposed between this chamber and the reaction chamber 16 is a silver-sulfide isolating membrane 52 which is selectively sensitive to the ion generated by the anode. The term selectively sensitive is used in this application to mean that the membrane will pass one particular ion, but essentially, or effectively, nothing else.

The coulometric generating circuit is completed by the platinum cathode 20 inserted directly in the sample stream. When current flows from the d-c current source 22, silver ions are generated at the anode 18. In the presence of the saturated solution of silver nitrate, passage of charge favors transfer of silver ion from this large reservoir through the membrane 52 into the reaction chamber 16, where the silver ions combine with the cyanide ions. Tests show that current efficiencies of virtually 100 percent can be obtained in the generation of silver reagent ions through such a membrane arrangement, thus permitting very high measurement accuracies.

The silver-sulfide membrane offers important advantages as an isolating membrane. For example silver-sulfide is highly immune to chemical oxidation. Also, silver-sulfide has a relatively low impedance. Experimental evidence indicates that the unique characteristics of silver-sulfide lead to the attainment of essentially 100 percent current efficiency, important to accurate measurements.

This virtually ideal current efficiency particularly lends itself to coulometric reagent generation for titration. That is, a fixed quantity of sample can be placed in a "working" compartment which communicates with a generator compartment by an isolating membrane as described. Current would be permitted to flow through the silver anode, and silver ions would migrate through the membrane to react with the sample. This migration of ions would continue until the "end point" has been detected by known means, indicating that a stoichiometric reaction has been effected. The integrated quantity of electrical current will be a measure of the sample concentration.

Various physical configurations could be used for such titration. For example, a three-compartment arrangement could be provided, with a center working compartment located between anode and cathode compartments. A silver-sulfide isolating membrane would be disposed between the working and anode compartments, as described above, and a salt bridge between the working and cathode compartments. The silver anode would, as before, be immersed in strong silver nitrate. The platinum cathode could be immersed in potassium nitrate. The sample placed in the working compartment would receive and react with silver ions migrating through the silver-sulfide membrane from the anode compartment.

Further details of such an arrangement may be found in an article by the present inventor and R. F. Mannion appearing in Analytical Chemistry, Volume 42, No. 2, February, 1970, page 285. Reference also may be made to prior art disclosures identified in that article, for background information related to this invention.

Although various embodiments of the invention have been described herein in detail, it should be understood that this is for the purpose of illustrating the invention, and should not be construed as necessarily limiting the invention, since it is clear that various modifications can be made by those skilled in this art to suit particular applications, without departing from the scope of the invention as circumscribed by the prior art. For example, an isolating membrane which passes a predictable amount of another ion, in addition to the desired one, may be made usable by providing suitable compensation arrangements.

Also, for some applications it may be unnecessary to use the feedback control of the current source, and instead maintain a constant concentration of silver ions in both sides of the cell, so that the output voltage will represent the cyanide concentration. Coulometric generation of silver ions can be used for the left-hand compartment of the differential cell, by means of a second current source and suitable electrodes. If that arrangement is used, the two current sources could be connected in series, to insure that they always produced equal amounts of silver ion.

I claim:

1. A method of analyzing the concentration of the ions of a flowing fluid sample the ions of which react chemically with silver ions, and wherein the fluid sample includes an oxidizing medium, said method comprising the steps of:

flowing current through a pair of electrodes, one of which is a silver electrode in a silver solution, to generate coulometrically a reagent containing silver ions for reacting chemically with ions of the fluid sample;

transferring said silver ions into said fluid sample to form a solution effecting said chemical reaction, to reduce the concentration of said silver ions by an amount proportional to the concentration of ions in the fluid sample;

isolating said silver electrode from said flowing fluid sample by interposing therebetween a silver-sulfide membrane which allows only silver ions to pass therethrough, whereby to prevent said oxidizing medium from reaching said silver electrode and generating additional silver ions;

flowing said solution by one side of a silver-sulfide membrane system sensitive to silver ions;

flowing a known concentration of silver ions by the other side of said silver-sulfide membrane system; and sensing the signal developed by said silver-sulfide membrane system to effect a measurement of the ionic concentration of the fluid sample.

* * * * *